(12) United States Patent
Kurokawa

(10) Patent No.: US 9,035,908 B2
(45) Date of Patent: May 19, 2015

(54) TOUCH PANEL, DISPLAY DEVICE, AND ELECTRONIC DEVICE

(75) Inventor: Yoshiyuki Kurokawa, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 1090 days.

(21) Appl. No.: 12/639,624

(22) Filed: Dec. 16, 2009

(65) Prior Publication Data

US 2010/0156850 A1  Jun. 24, 2010

(30) Foreign Application Priority Data

Dec. 24, 2008 (JP) .................................. 2008-327920

(51) Int. Cl.
| | | |
|---|---|---|
| G06F 3/042 | (2006.01) | |
| G02F 1/1333 | (2006.01) | |
| G06F 3/041 | (2006.01) | |
| G02F 1/133 | (2006.01) | |
| G09G 3/34 | (2006.01) | |

(52) U.S. Cl.
CPC .......... *G06F 3/0412* (2013.01); *G02F 1/13338* (2013.01); *G02F 2001/13312* (2013.01); *G06F 3/042* (2013.01); *G09G 3/3406* (2013.01); *G09G 2310/0235* (2013.01); *G09G 2320/0626* (2013.01); *G09G 2360/144* (2013.01)

(58) Field of Classification Search
None
See application file for complete search history.

(56) References Cited

U.S. PATENT DOCUMENTS

| | | | |
|---|---|---|---|
| 6,542,105 B2 | 4/2003 | Sakuragi | |
| 6,747,638 B2 | 6/2004 | Yamazaki et al. | |
| 7,068,254 B2 | 6/2006 | Yamazaki et al. | |
| 7,602,380 B2 | 10/2009 | Yoshida et al. | |
| 2005/0219229 A1 | 10/2005 | Yamaguchi | |
| 2006/0220077 A1 | 10/2006 | Hayashi et al. | |
| 2009/0195511 A1* | 8/2009 | Cites et al. ................. | 345/173 |

FOREIGN PATENT DOCUMENTS

| | | |
|---|---|---|
| EP | 1635250 A | 3/2006 |
| JP | 2000-152082 | 5/2000 |
| JP | 2001-292276 | 10/2001 |
| JP | 2002-033823 | 1/2002 |

(Continued)

OTHER PUBLICATIONS

International Search Report (Application No. PCT/JP2009/071199; PCT12103) Dated Feb. 2, 2010.

(Continued)

*Primary Examiner* — Adam R Giesy
(74) *Attorney, Agent, or Firm* — Nixon Peabody LLP; Jeffrey L. Costellia

(57) ABSTRACT

It is an object to provide a touch panel with high precision, high-speed operation, and low power consumption, which is caused by reduction of power consumption in an A/D converter circuit is reduced. In the touch panel in which a photo sensor is included in a pixel and an A/D converter circuit is provided every one column or a plurality of columns of the pixels, a control signal of the A/D converter circuit is sequentially supplied by a shift register included in an ADC (A/D converter circuit) control circuit, and respective periods when the plurality of A/D converter circuits operates are not overlap with each other. Accordingly, the number of A/D converter circuits which operate at the same time is decreased, and instantaneous power consumption in the A/D converter circuit is decreased.

20 Claims, 11 Drawing Sheets

(56) References Cited

FOREIGN PATENT DOCUMENTS

| | | |
|---|---|---|
| JP | 2002-185328 | 6/2002 |
| JP | 2002-217733 | 8/2002 |
| JP | 2005-293374 A | 10/2005 |
| JP | 2005-301373 A | 10/2005 |
| JP | 2006-244218 A | 9/2006 |
| JP | 2006-244407 A | 9/2006 |
| JP | 2007-183706 | 7/2007 |
| JP | 2008-242268 A | 10/2008 |
| JP | 2008-242468 | 10/2008 |

OTHER PUBLICATIONS

Written Opinion (Application No. PCT/JP2009/071199; PCT12103) Dated Feb. 2, 2010.

Tanaka, K. et al., "A CG Silicon System LCD with Multi-Mode Optical Input Function," AM-FPD '08 Digest of Technical Papers, Jul. 2, 2008, pp. 89-92, The Japan Society of Applied Physics.

* cited by examiner

TOUCH PANEL, DISPLAY DEVICE, AND ELECTRONIC DEVICE

BACKGROUND OF THE INVENTION

1. Field of the Invention

The present invention disclosed in this specification relates to a touch panel including a touch sensor and a method for driving the touch panel. In particular, the present invention relates to a touch panel in which pixels each including a touch sensor are arranged in matrix and a method for driving the touch panel. Further, the present invention relates to a display device and an electronic device including the touch sensor.

2. Description of the Related Art

In recent years, a so-called touch panel, that is, a display device provided with a touch sensor, has attracted attention. Examples of the touch sensor includes a resistive touch sensor, a capacitive touch sensor, and an optical touch sensor which are different in operation principle. An object to be detected is touched to a display device, whereby data is input to the display device.

In an optical touch panel, a touch sensor which detects light is provided, and a display screen also serves as an input region. As an example of a device including such an optical touch sensor, a display device having an image capturing function by a contact area sensor, is given (for example, see Patent Document 1). In the optical touch panel, light is emitted from the touch panel. In the case where an object to be detected exists at a given position of the touch panel, light at the region where the object to be detected exists is blocked by the object to be detected, and part of light is reflected. A photo sensor (also referred to as a photoelectric conversion element) which can detect light is provided in a pixel of the touch panel; therefore, the photo sensor detects the reflected light, so that existence of the object to be detected in the region can be recognized.

In addition, it has been attempted to provide a personal authentication function or the like for an electronic device typified by a portable information terminal such as a mobile phone (for example, see Patent Document 2). A fingerprint, a face, a handprint, a palm print, a pattern of a hand vein, and the like are used for personal authentication. In the case where the personal authentication function is provided in a portion different from the display portion, the number of components is increased, and the weight or the price of the electronic device could possibly be increased. Patent Document 3 discloses a technique by which detection at a fingertip is performed in accordance with the brightness of outside light.

REFERENCE

[Patent Document 1] Japanese Published Patent Application No. 2001-292276
[Patent Document 2] Japanese Published Patent Application No. 2002-033823
[Patent Document 3] Japanese Published Patent Application No. 2007-183706

SUMMARY OF THE INVENTION

When a touch panel is used for an electronic device having a personal authentication function, electrical signals which photo sensors each provided in each pixel of the touch panel generates by detecting light are collected and image processing needs to be performed. In particular, large amount of data obtained by a number of photo sensors needs to be efficiently collected in order to realize an electronic device with high precision and high-speed operation including a personal authentication function. In addition, since the electrical signals generated by photo sensors are analog signals, conversion from an analog signal to a digital signal (A/D conversion) is needed in order to perform image processing. That is, an A/D converter circuit with high throughput is needed.

In view of above problems, it is an object of the present invention is to provide a touch panel with high precision, high-speed operation, and low power consumption, which is caused by reduction of power consumption in an A/D converter circuit.

An embodiment of the present invention disclosed in the specification is, in a touch panel in which a photo sensor is included in a pixel and an A/D converter circuit is provided every one line or a plurality of lines of pixels, a control signal of the A/D converter circuit is sequentially supplied by a shift register. Accordingly, the number of A/D converter circuits which operate at the same time can be decreased and instantaneous power consumption in an A/D converter circuit are decreased.

An embodiment of the present invention disclosed in the specification is a touch panel including a plurality of pixels each including a pixel circuit including a photo sensor and a photo sensor control circuit. The photo sensor control circuit includes a photo sensor signal line reading circuit for taking an output signal of the photo sensor. The photo sensor signal line reading circuit includes an A/D converter circuit (ADC) control circuit and a plurality of A/D converter circuits. The ADC control circuit includes a shift register, and the plurality of A/D converter circuits is each provided every one column or a plurality of columns of the plurality of pixels. A control signal is sequentially supplied to the plurality of A/D converter circuits by the shift register in the ADC control circuit.

An embodiment of the present invention disclosed in the specification is a touch panel including a plurality of pixels each including a pixel circuit including a photo sensor and a photo sensor control circuit. The photo sensor control circuit includes a photo sensor signal line reading circuit for taking an output signal of the photo sensor. The photo sensor signal line reading circuit includes an A/D converter circuit (ADC) control circuit and a plurality of A/D converter circuits. The plurality of A/D converter circuits is each provided every one column or a plurality of columns of the plurality of pixels. At least one of A/D converter circuits does not operate during a period when one of other the plurality of A/D converter circuits operates.

An embodiment of the present invention disclosed in the specification is a touch panel including a plurality of pixels each including a pixel circuit including a photo sensor and a photo sensor control circuit. The photo sensor control circuit includes a photo sensor signal line reading circuit for taking an output signal of the photo sensor. The photo sensor signal line reading circuit includes an A/D converter circuit (ADC) control circuit and a plurality of A/D converter circuits. The plurality of A/D converter circuits is each provided every one column or a plurality of columns of the plurality of pixels. Each of the plurality of A/D converter circuits includes a comparator circuit. At least one of comparator circuits does not operate during a period when one of other a plurality of comparator circuits operates.

An embodiment of the present invention disclosed in the specification is a touch panel including a plurality of pixels each including a pixel circuit including a photo sensor and a photo sensor control circuit. The photo sensor control circuit includes a photo sensor signal line reading circuit for taking an output signal of the photo sensor. The photo sensor signal line reading circuit includes an A/D converter circuit (ADC)

control circuit and a plurality of A/D converter circuits. The plurality of A/D converter circuits is each provided every one column or a plurality of columns of the plurality of pixels. Respective periods when a plurality of A/D converter circuits operates do not overlap with each other.

An embodiment of the present invention disclosed in the specification is a touch panel including a plurality of pixels each including a pixel circuit including a photo sensor and a photo sensor control circuit. The photo sensor control circuit includes a photo sensor signal line reading circuit for taking an output signal of the photo sensor. The photo sensor signal line reading circuit includes an A/D converter circuit (ADC) control circuit and a plurality of A/D converter circuits. The plurality of A/D converter circuits is each provided every one column or the plurality of columns of a plurality of pixels. Each of the plurality of A/D converter circuits includes a comparator circuit. Respective periods when a plurality of comparator circuits operates do not overlap with each other.

The present invention disclosed in the specification can provide a touch panel which enables reading image to perform with high spatial resolution and high gray scale level at high-speed and low power consumption.

DETAILED DESCRIPTION OF THE INVENTION

Figure 1:
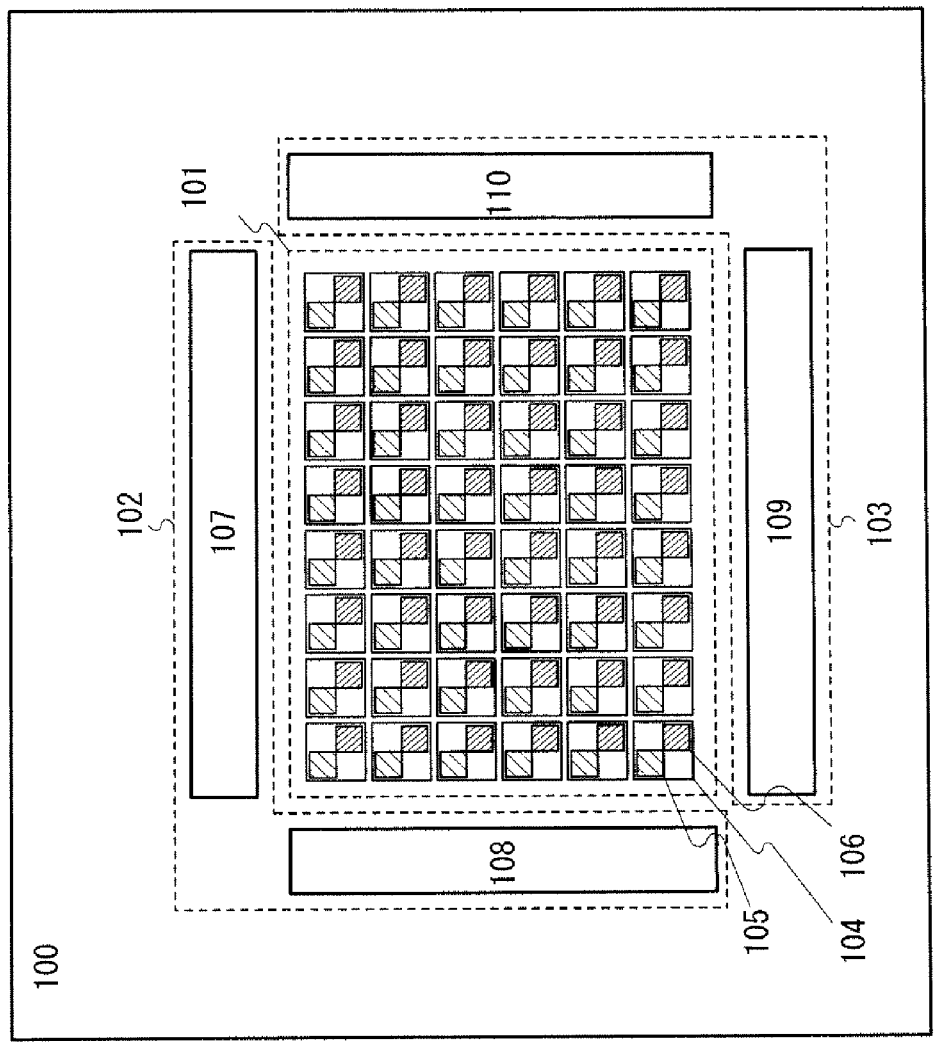
FIG. 1 is a diagram illustrating an example of a touch panel.

Hereinafter, embodiments are described with reference to drawings. However, the embodiments can be implemented in various different modes, and it is to be easily understood that various changes and modifications in modes and details thereof will be apparent to those skilled in the art without departing from the meaning and the scope of the disclosed invention. Therefore, the present invention should not be interpreted as being limited to the description of the embodiment to be given below. Note that in the drawings for explaining the embodiments, the same parts or parts having a similar function are denoted with the same reference numerals, and description of such parts is not repeated.

Embodiment Mode 1

Figure 2:
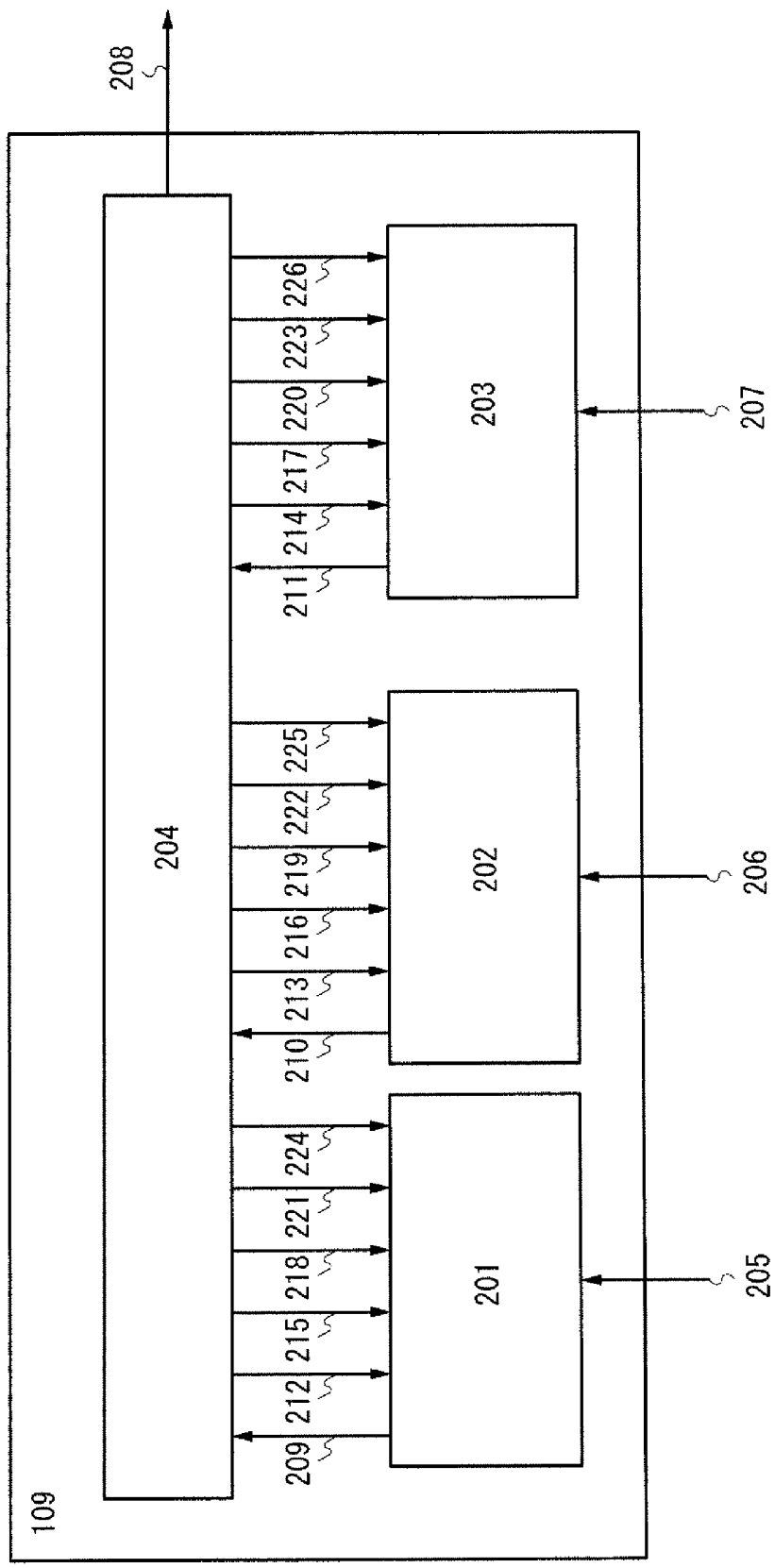
FIG. 2 is a diagram illustrating an example of a structure of a photo sensor signal line reading circuit.
Figure 3:
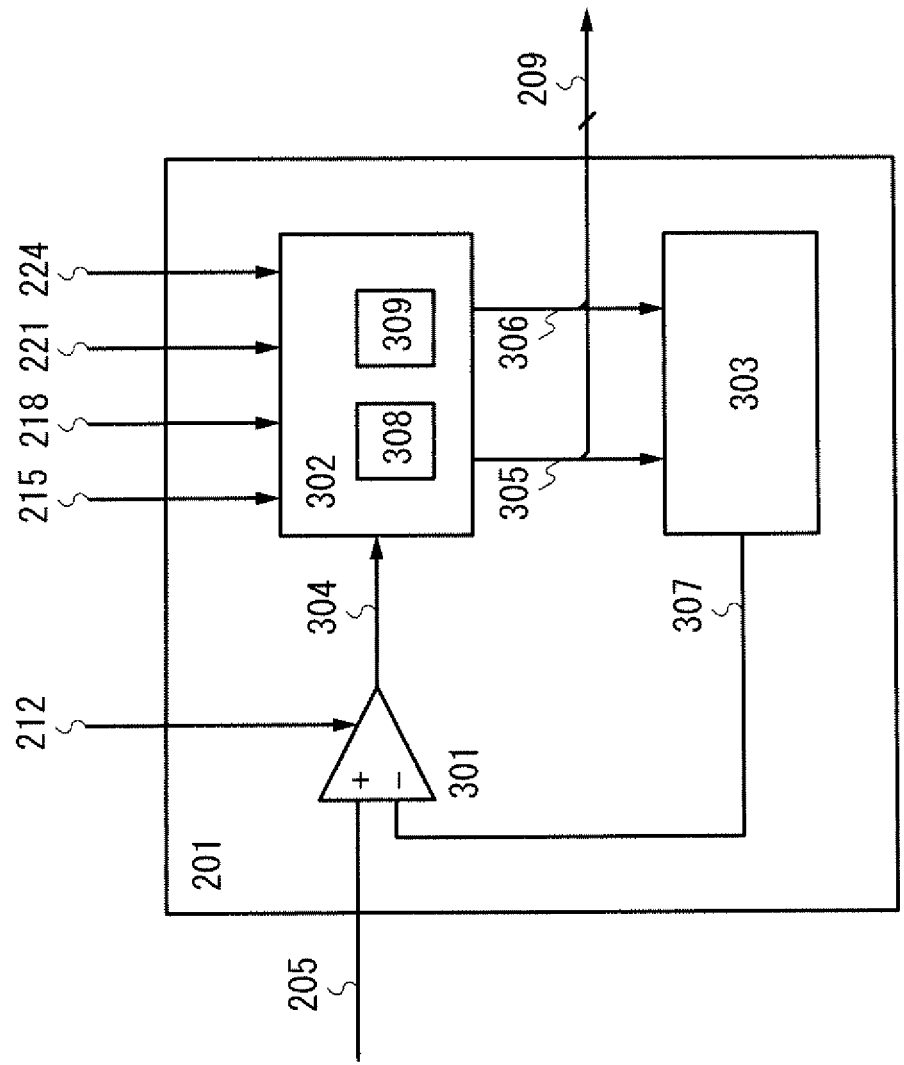
FIG. 3 is a diagram illustrating an example of a structure of an A/D converter circuit.
Figure 4:
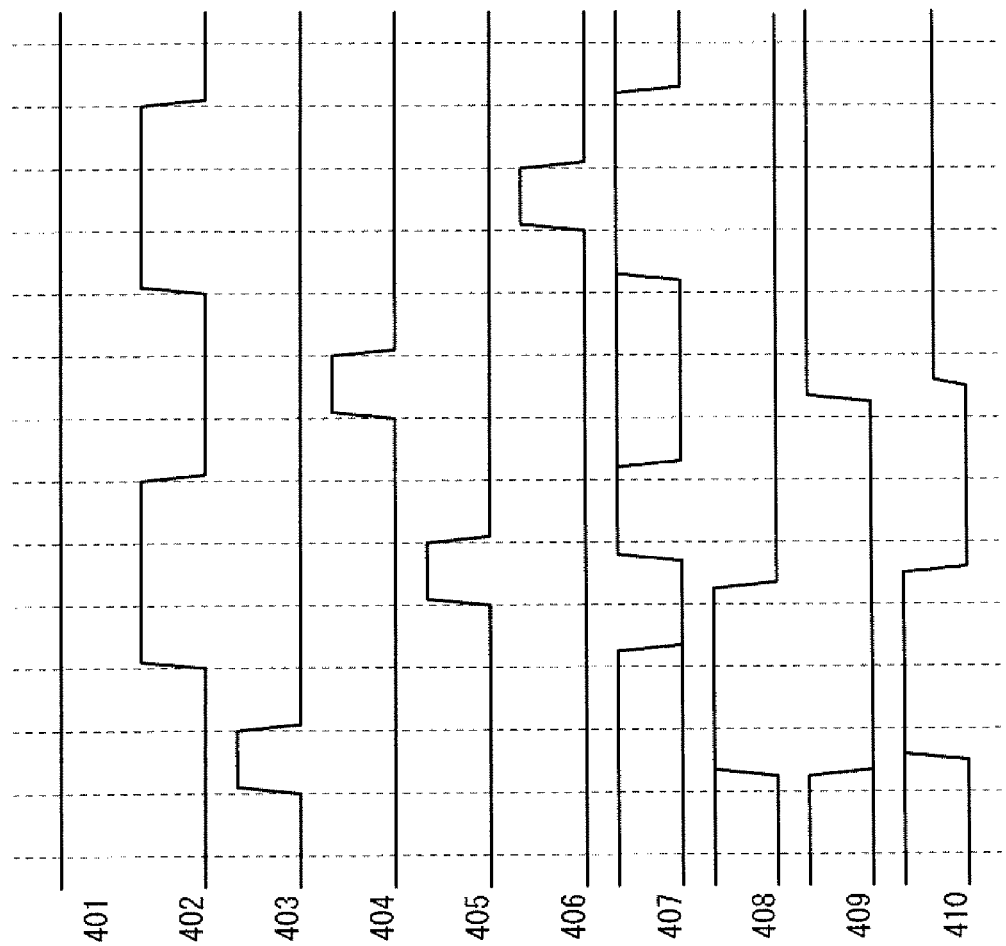
FIG. 4 is a timing chart illustrating an example of operation of an A/D converter circuit.

FIG. 1, FIG. 2, FIG. 3, and FIG. 4 illustrate an example of a touch panel in the present invention disclosed in the specification. FIG. 1 is a diagram illustrating an example of a touch panel. FIG. 2 is a diagram illustrating an example of a circuit structure of a photo sensor signal line reading circuit. FIG. 3 is a diagram illustrating an example of a structure of an A/D converter circuit included in the photo sensor signal line reading circuit included in the touch panel. FIG. 4 is a diagram illustrating an example of operation of the A/D converter circuit.

In FIG. 1, a touch panel 100 includes a pixel circuit 101, a display element control circuit 102, and a photo sensor control circuit 103.

The pixel circuit 101 includes a plurality of pixels 104 arranged in matrix. Each pixel 104 includes a display element 105 and a photo sensor 106.

The display element 105 includes a thin film transistor (a TFT), a storage capacitor, a liquid crystal layer, a color filter, and the like. The contrast (gray scale) of light which penetrates the liquid crystal layer is made, utilizing a phenomena that the polarization direction is changed by applying voltage to the liquid crystal layer. Thus, display of an image is realized. External light or light source (backlight) emitted from the backside of a liquid crystal display device is used for the light which penetrates the liquid crystal layer. Further, a gray scale of a specific color (for example, R, G, or B) can be made with light which penetrates the liquid crystal layer and passes through a color filter. Thus, display of a colored image is realized. The storage capacitor has a function to hold charge which corresponds to voltage applied to the liquid crystal layer. The TFT has a function to control injection/emission of charge to/from the storage capacitor.

The photo sensor 106 includes an element having a function to output electric signals by receiving light, such as a photo diode. Note that for light which the photo sensor 106 receives, reflection light or transmitted light which is generated when an object to be detected is irradiated with external light or backlight can be used. Here, the pixels 104 having a functions to emit red (R), green (G), and blue (B) light by using color filters are referred to as an R pixel, a G pixel, and a B pixel respectively. Note that among reflection light or transmitted light which is generated when an object to be detected is irradiated with external light or backlight, R, G, and B can be taken by an optical sensor in the R pixel, the G pixel, and the B pixel respectively.

The display element control circuit 102 includes a display element signal line driver circuit 107 and a display element scan line driver circuit 108 and controls the display element 105. For example, the display element scan line driver circuit 108 has a function to select a display element in a specific row. In addition, the display element signal line driver circuit 107 has a function to apply a predetermined potential to a display element in a selected row. Note that in the display element selected by the display element scan line driver circuit 108, a TFT is in conducting state and charge given by the display element signal line driver circuit 107 is supplied to a storage capacitor.

The photo sensor control circuit 103 includes a photo sensor signal line reading circuit 109 and a photo sensor scan line driver circuit 110 and controls the photo sensor 106. For example, the photo sensor scan line driver circuit 110 has a function to operate a photo sensor only in a specific row. In addition, the photo sensor signal line reading circuit 109 has a function to take an output signal of a photo sensor in a specific column.

FIG. 2 illustrates an example of a structure of the photo sensor signal line reading circuit 109. In FIG. 2, the following are included: a first A/D converter circuit (ADC) 201 to a third ADC 203; an ADC control circuit 204; a first photo sensor signal line 205 to a third photo sensor signal line 207; a photo sensor signal line reading circuit output signal line 208; a first ADC output signal line 209 to a third ADC output signal line 211; a first ADC enable signal line 212 to a third ADC enable signal line 214; a first ADC reset 1 signal line 215 to a third ADC reset 1 signal line 217; a first ADC reset 2 signal line 218 to a third ADC reset 2 signal line 220; a first ADC set 1 signal line 221 to a third ADC set 1 signal line 223; and a first ADC set 2 signal line 224 to a third ADC set 2 signal line 226.

The ADC control circuit 204 generates a potential for outputting to the photo sensor signal line reading circuit output signal line 208 from potentials of the first ADC output signal line 209 to the third ADC output signal line 211. Specifically, one of the first ADC output signal line 209 to the third ADC output signal line 211 is selected and a potential of the selected signal line is output to the photo sensor signal line reading circuit output signal line 208. Further, the ADC control circuit 204 generates a potential output to each of the first ADC output signal line 209 to the third ADC output signal line 211, the first ADC enable signal line 212 to the third ADC enable signal line 214, the first ADC reset 1 signal line 215 to the third ADC reset 1 signal line 217, the first ADC reset 2 signal line 218 to the third ADC reset 2 signal line 220, the first ADC set 1 signal line 221 to the third ADC set 1 signal line 223, and the first ADC set 2 signal line 224 to the third ADC set 2 signal line 226. The ADC control circuit 204 includes at least one shift register. By the shift register, potentials are generated and then sequentially supplied to the first ADC 201 to a third ADC 203, respectively. Potentials supplied to the first ADC 201 to a third ADC 203 can be used as control signals of the first ADC 201 to a third ADC 203. Moreover, the ADC control circuit 204 may include first to fifth shift registers. That is, the ADC control circuit 204 may include: a first shift register supplying signals to the first ADC enable signal line 212, the second ADC enable signal line 213, and the third ADC enable signal line 214, respectively; a second shift register supplying signals to the first ADC reset 1 signal line 215, the second ADC reset 1 signal line 216, and the third ADC reset 1 signal line 217, respectively; a third shift register supplying signals to the first ADC reset 2 signal line 218, the third ADC reset 2 signal line 219, and the third ADC reset 2 signal line 220, respectively; a fourth shift register supplying signals to the first ADC set 1 signal line 221, the third ADC set 1 signal line 222, and the third ADC set 1 signal line 223, respectively; a fifth shift register supplying signals to the first ADC set 2 signal line 224, the third ADC set 2 signal line 225, and the third ADC set 2 signal line 226, respectively. Further, it is possible to combine two or more shift registers arbitrarily chosen among the first to fifth shift registers.

Here, for easy understanding, operation of the ADC 201 is described in detail before operation of the ADC control circuit 204 is described.

An example of a structure of the ADC 201 is shown in FIG. 3. Here, the ADC 201 is the successive A/D converter circuit. In FIG. 3 the following are included: a comparator circuit (CMP) 301; a successive conversion register (SAR) 302; a D/A converter circuit (DAC) 303; a CMP output signal line 304; a first SAR output signal line 305; a second SAR output signal line 306; and a DAC output signal line 307. The first SAR output signal line 305 and the second SAR output signal line 306 form the ADC output signal line 209. That is, the ADC output signal line 209 shows an example of a two-bit signal line in FIG. 3.

The CMP 301 has the photo sensor signal line 205 and the DAC output signal line 307 as input signal lines, and performs comparison between potentials of the signal lines. Then, the CMP 301 outputs "H" or "L" to the CMP output signal line 304 in accordance with a comparison result thereof. Here, "H" is output when the potential of the photo sensor signal line 205 is higher than that of the DAC output signal line 307, and "L" is output when the potential of the photo sensor signal line 205 is lower than that of the DAC output signal line 307. Further, the CMP 301 can operate or stop by controlling a potential of the ADC enable signal line 212. Power consumption of the CMP 301 can be significantly reduced while the CMP 301 is stopped, which can realized by, for example, stopping the power supply voltage supplied to the CMP 301. Here, the CMP 301 operates when the potential of the ADC enable signal line 212 is "H" and the CMP 301 stops when the potential of the ADC enable signal line 212 is "L."

In the SAR 302, a potential corresponding to the potential of the CMP output signal line 304 is held in a first holding circuit 308 by controlling a potential of the ADC set 1 signal line 221. A potential corresponding to the potential of the CMP output signal line 304 is held in a second holding circuit 309 by controlling a potential of the ADC set 2 signal line 224. The potential held in the first holding circuit 308 and the second holding circuit 309 can be reset by controlling a potential of the reset 1 signal line 215. The potential held in the second holding circuit 309 can be reset by controlling a potential of the reset 2 signal line 218.

Such the first holding circuit 308 and the second holding circuit 309 each can include as a level sensitive latch, an edge sensitive latch, and the like. Here, the first holding circuit 308 and the second holding circuit 309 each include an edge sensitive latch. When the potential of the ADC set 1 signal line 221 (or the ADC set 2 signal line 224) is changed from "L" to "H," "H" is held in the first holding circuit 308 (or the second holding circuit 309) if the potential of the CMP output signal line 304 is "H", and "L" is held in the first holding circuit 308 (or the second holding circuit 309) if the potential of the CMP output signal line 304 is "L." Further, when the potential of the reset 1 signal line 215 is set to "H," the first holding circuit 308 and the second holding circuit 309 hold "H" and "L", respectively. When the potential of the reset 2 signal line 218 is set to "H," the second holding circuit 309 holds "H."

In addition, in the SAR 302, the potential held in the first holding circuit 308 the potential held in and the second holding circuit 309 are output to the first SAR output signal line 305 and the second SAR output signal line 306 respectively.

The DAC 303 outputs a potential, which is determined by the potential of the first SAR output signal line 305 and the potential of the second SAR output signal line 306, to the DAC output signal line 307. Here, when the potential of the first SAR output signal line 305 and the potential of the second SAR output signal line 306 each are ("L", "L"), ("L", "H"), ("H", "L"), or ("H", "H"), 0 V, 1 V, 2 V, or 3 V is respectively output to the DAC output signal line 307. The DAC 303 can be formed by using a resistive type, a capacitive type, or the like.

Next, an example of operation of the ADC 201 is described with reference to a timing chart shown in FIG. 4. In FIG. 4, a signal 401 corresponds to a potential of the photo sensor signal line 205; a signal 402 a potential of the ADC enable signal line 212; a signal 403 a potential of the ADC reset 1 signal line 215; a signal 404 a potential of the ADC reset 2 signal line 218; a signal 405 a potential of the ADC set 1 signal line 221; a signal 406 a potential of the ADC set 2 signal line 224; a signal 407 a potential of the CMP output signal line 304; a signal 408 a potential of the first SAR output signal line 305; a signal 409 a potential of the second SAR output signal line 306; and a signal 410 a potential of the DAC output signal line 307. Note that the potential (the signal 401) of the photo sensor signal line 205 is 1.5 V.

As for the operation of the ADC 201, first, when the potential of the ADC reset 1 signal line 215 (signal 403) is made to be "H," potentials held in the first holding circuit 308 and the second holding circuit 309 are reset. Then, the potential of the first SAR output signal line 305 (signal 408) becomes "H" and the potential of the second SAR output signal line 306 (signal 409) becomes "L." In addition, the potential of the DAC output signal line 307 (signal 410) becomes 2 V.

Next, when the potential of the ADC enable signal line 212 (signal 402) is made to be "H," the CMP 301 operates and compares the potential (1.5 V) of the photo sensor signal line 205 (signal 401) and the potential (2 V) of the DAC output signal line 307 (signal 410). Since the potential of the DAC output signal line 307 (signal 410) is higher, the potential of the CMP output signal line 304 (signal 407) becomes "L."

Next, when the potential of the ADC set 1 signal line 221 (signal 405) is made to be "H," "L" is held in the first holding circuit 308 and the potential of the first SAR output signal line 305 (signal 408) becomes "L." In addition, the potential of the DAC output signal line 307 (signal 410) becomes 0 V. Note that comparison between the potential (1.5 V) of the photo sensor signal line 205 (signal 401) and the potential (0 V) of the DAC output signal line 307 (signal 410) is performed. Since the potential of the DAC output signal line 307 (signal 410) is lower, the potential of the CMP output signal line 304 (signal 407) becomes "H."

Next, when the potential of the ADC enable signal line 212 (signal 402) is made to be "L," the CMP 301 stops operating.

Next, when the potential of the ADC reset 2 signal line 218 (signal 404) is made to be "H," the potential held in the second holding circuit 309 is reset and the potential of the second SAR output signal line 306 (signal 409) becomes "H." In addition, the potential of the DAC output signal line 307 (signal 410) becomes 1 V.

Next, when the potential of the ADC enable signal line 212 (signal 402) is made to be "H," the CMP 301 operates and compares the potential (1.5 V) of the photo sensor signal line 205 (signal 401) and the potential (1 V) of the DAC output signal line 307 (signal 410). Since the potential of the DAC output signal line 307 (signal 410) is lower, the potential of the CMP output signal line 304 (signal 407) becomes "H."

Next, when the potential of the ADC set 2 signal line 224 (signal 406) is made to be "H," "H" is held in the second holding circuit 309. Here, since "H" is originally held in the second holding circuit 309, the potential of the second SAR output signal line 306 (signal 409) is maintained to be "H." In addition, the potential of the DAC output signal line 307 (signal 410) is also maintained as 1 V.

Accordingly, "L" or "H" is output as data of A/D conversion from the ADC output signal line 209.

In this manner, in the successive A/D converter circuit, the output of DAC is sequentially changed by changing the potentials held in the holding circuits in the SAR, and compared to a potential to be measured, so that the potential to be measured is decided. Although description is made in the case of the 2-bit A/D converter circuit here, a higher-bit A/D converter circuit can operate in a similar manner.

Here, in FIG. 2, the ADC control circuit outputs data, which is obtained by A/D conversion in the first ADC 201 to the third ADC 203, from the photo sensor signal line reading circuit output signal line 208. It is preferable that the data is sequentially output in time series not at the same time. This is because in the case where the data is output at the same time, the number of the photo sensor signal line reading circuit output signal line 208 increases and it becomes very complicated to provide signal lines when the signal lines are taken from a touch panel. In this case, there is a time lag until the A/D converted data which is converted in the first ADC 201 to the third ADC 203 is actually output from the photo sensor signal line reading circuit output signal line 208.

In other words, the A/D conversion in the first ADC 201 to the third ADC 203 does not need to be performed at the same time. That is, it is acceptable as long as the A/D conversion is performed before the A/D converted data in the ADC is output from the photo sensor signal line reading circuit output signal line 208. That is, A/D conversion in the first ADC 201 to the third ADC 203 can be sequentially performed in time series, not at the same time. In the first ADC 201 to the third ADC 203, for example, a shift register can be used as a method for performing sequential A/D conversion in time series. The ADC control circuit may include the shift register. By using the shift register, a control signal can be sequentially supplied to the first ADC 201 to the third ADC 203. Note that although the case where the number of ADCs is three is shown here, the number of ADCs is not limited to this. The number of ADCs can be increased or decreased in accordance with the number of pixel columns or the like.

In this manner, instantaneous power consumption in the ADC can be reduced. In addition, generally, power consumption in the ADC is in a trade-off relationship with the precision of A/D conversion (voltage resolution, gray scale) and the speed of A/D conversion. Accordingly, the ADC with the higher speed and higher precision can be used. Further, since A/D conversion and data output in each ADC are performed in an assembly line manner (pipeline processing), time for A/D conversion in each ADC can be longer. That is, the speed of A/D conversion becomes relatively higher.

In this manner, the A/D converter circuit with high throughput can be formed by providing the A/D converter circuits every column of pixels or every a plurality of columns of pixels. However, when a plurality of A/D converter circuits each provided every column of pixels or every a plurality of columns of pixels operates at the same time, power consumption rises instantaneously at the timing of operating a number of A/D converter circuits. If power consumption rises instantaneously, a voltage drop occurs and causes malfunction. Further, heat generation might occur. As described above, the A/D converter circuits sequentially operates in time series not at the same time, so that instantaneous increase of power consumption can be prevented because not all of A/D converter circuits operate at the same time. During a period of operating one of a plurality of A/D converter circuits, at least one of the other a plurality of A/D converter circuits can be set not to operate. Accordingly, instantaneous increase of power consumption can be prevented. As a result, a touch panel whose power consumption in the A/D converter circuit is reduced, with high precision, low power consumption, and high-speed operation can be provided.

Embodiment Mode 2

Figure 5:
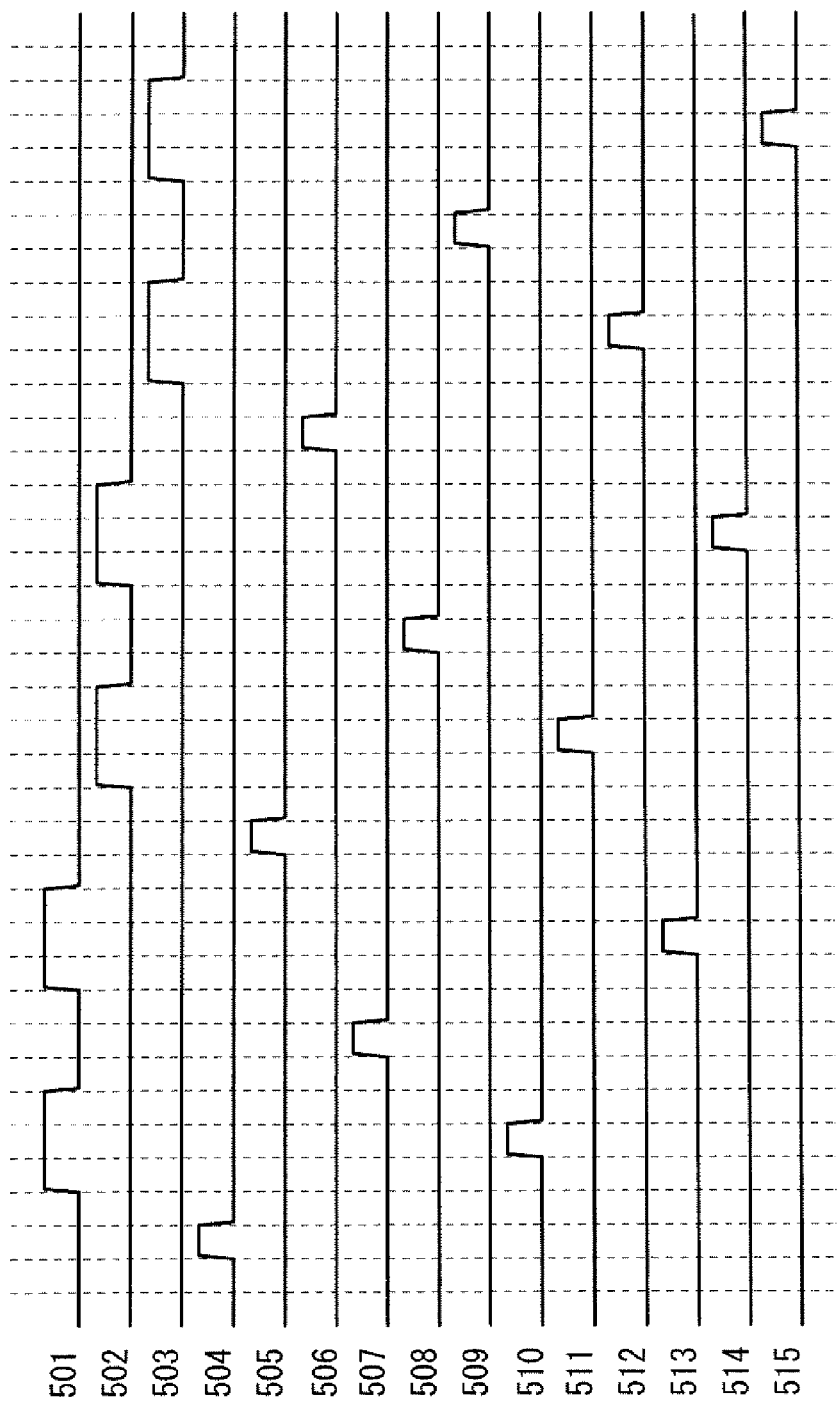
FIG. 5 is a timing chart illustrating an example of operation of an A/D converter circuit.

In the touch panel shown in Embodiment 1, a timing chart illustrating an example of the operation of the A/D converter circuit is shown in FIG. 5. In specific, a timing chart illustrating an example of operation that A/D conversion is sequentially performed in time series not at the same time in the ADC is shown in FIG. 5.

In FIG. 5, a signal 501 corresponds to a potential of the first ADC enable signal line 212 in FIG. 2; a signal 502 a potential of a second ADC enable signal line 213; a signal 503 a potential of the third ADC enable signal line 214; a signal 504 a potential of the first ADC reset 1 signal line 215; a signal 505 a potential of the second ADC reset 1 signal line 216; a signal 506 a potential of the third ADC reset 1 signal line 217; a signal 507 a potential of the first ADC reset 2 signal line 218; a signal 508 a potential of the second ADC reset 2 signal line 219; a signal 509 a potential of the third ADC reset 2 signal line 220; a signal 510 a potential of the first ADC set 1 signal line 221; a signal 511 a potential of the second ADC set 1 signal line 222; a signal 512 a potential of the third ADC set 1 signal line 223; a signal 513 a potential of the first ADC set 2 signal line 224; a signal 514 a potential of the second ADC set 2 signal line 225; and a signal 515 a potential of the third ADC set 2 signal line 226.

As described in FIG. 4, the first ADC 201 can operate by using the signals 501, 504, 507, 510, and 513. Similarly, the second ADC 202 can operate by using the signals 502, 505, 508, 511, and 514. Further, the third ADC 203 can operate by using the signals 503, 506, 509, 512, and 515.

Here, in the first ADC enable signal line 212 (signal 501) to the third ADC enable signal line 214 (signal 503), periods of "H," that is, periods when the CMPs in the ADC 201 to the ADC 203 operate do not overlap with each other. Instantaneous increase of power consumption can be reduced by decreasing the number of CMPs which operates at the same time. For example, a shift register can be use for controlling not to overlap periods when the CMPs in the ADC 201 to the ADC 203 operate, that is, the period when the first ADC enable signal line 212 (signal 501) to the third ADC enable signal line 214 (signal 503) are "H," with each other. The shift register can be included in the ADC control circuit 204 shown in FIG. 2. By using a shift register, a control signal can be sequentially supplied to the first ADC 201 to the third ADC 203 in time series. Note that although the case where the number of ADCs is three is shown here, the number of ADCs is not limited to this. The number of ADCs can increase or decrease in accordance with the number of columns of pixels or the like.

In this manner, the A/D converter circuits sequentially operates in time series not at the same time, so that instantaneous increase of power consumption can be prevented because not all of the A/D converter circuits operate at the same time. During a period of operating one of a plurality of A/D converter circuits, at least one of the other a plurality of A/D converter circuits can be set not to operate. Accordingly, instantaneous increase of power consumption can be prevented. Periods when a plurality of A/D converter circuits operates can be set not to overlap each other. Accordingly, instantaneous increase of power consumption can be prevented. As a result, a touch panel whose power consumption in the A/D converter circuit is reduced, with high precision, low power consumption, and high-speed operation can be provided.

Embodiment Mode 3

Figure 6:
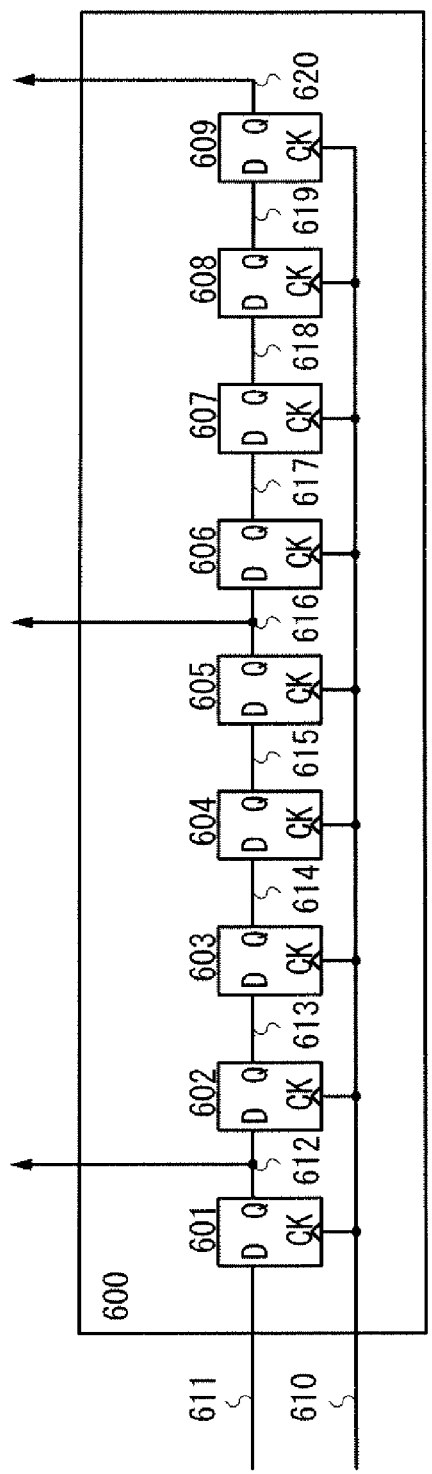
FIG. 6 is a diagram illustrating an example of a structure of a shift register.
Figure 7:
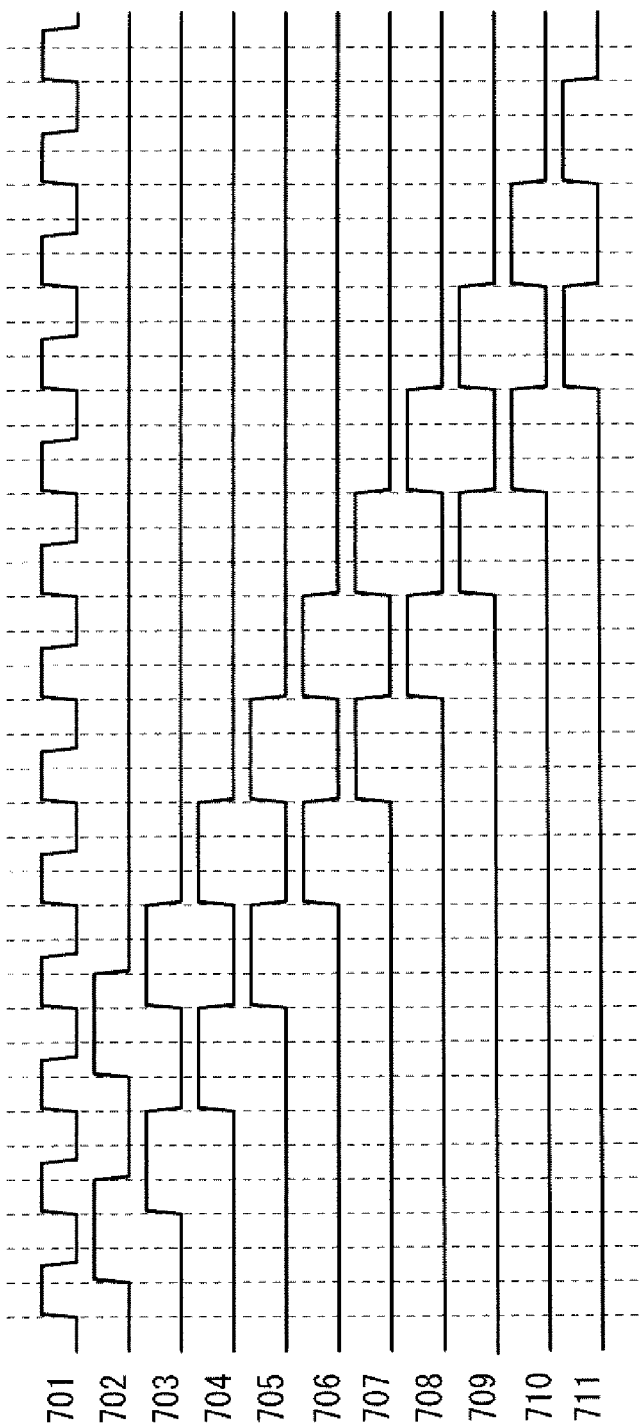
FIG. 7 is a timing chart illustrating an example of operation of a shift register.

An example of a shift register which realizes the timing chart shown in FIG. 5 is shown in FIG. 6 and FIG. 7. FIG. 6 is a diagram illustrating an example of a structure of the shift register. FIG. 7 is a timing chart illustrating an example of operation of the shift register.

Potential of all signal lines shown in FIG. 5 can be supplied from an external circuit in order to realize the timing chart shown in FIG. 5. However, the number of ADCs is increased in the case where spatial resolution of a touch panel is improved. In addition, the number of bits of the ADC is increased in the case where the number of gray scales is improved. Spatial resolution and the number of gray scales are increased as characteristics of a touch panel are improved. Accordingly, when potentials of all signal lines shown in FIG. 5 are supplied from an external circuit, the number of signal lines is extremely large as characteristics of a touch panel are improved, especially. Accordingly, even if all signals can be generated in an external circuit, it is not realistic to supply the signals to the touch panel actually.

Thus, a shift register shown in FIG. 6 will be considered. A shift register which generates potentials of the first ADC enable signal line 212 to the third ADC enable signal line 214 is shown here. However, a shift register which generates potentials of the first ADC reset 1 signal line 215 to the third ADC reset 1 signal line 217, a shift register which generates potentials of the first ADC reset 2 signal line 218 to the third ADC reset 2 signal line 220, a shift register which generates potentials of the first ADC set 1 signal line 221 to the third ADC set 1 signal line 223, and a shift register which generates potentials of the first ADC set 2 signal line 224 to the third ADC reset 2 signal line 226 can be also formed in a similar manner.

In FIG. 6, a shift register 600 includes a first edge sensitive latch 601 to a ninth edge sensitive latch 609, a clock signal line 610, a start signal line 611, and a first output signal line 612 to a ninth output signal line 620. When potential which is held in an edge sensitive latch is output from a Q terminal and a signal which is input to a CK terminal is changed from "L" to "H," and holding contents are rewritten to the potential of a D terminal. Note that although an edge sensitive latch is used as a latch, the present invention is not limited to this. A level sensitive latch may be used as a latch.

A timing chart of the shift register 600 is shown in FIG. 7. In FIG. 7, a signal 701 corresponds to a potential of the clock signal line 610; a signal 702 a potential of the start signal line 611; a signal 703 a potential of the first output signal line 612; a signal 704 a potential of the second output signal line 613; a signal 705 a potential of the third output signal line 614; a signal 706 a potential of the fourth output signal line 615; a signal 707 a potential of the fifth output signal line 616; a signal 708 a potential of the sixth output signal line 617; a signal 709 a potential of the seventh output signal line 618; a signal 710 a potential of the eighth output signal line 619; and a signal 711 a potential of the ninth output signal line 620. When the potential of the clock signal line 610 (signal 701) is changed from "L" to "H," the first edge sensitive latch 601 takes the potential of the start signal line 611 (signal 702), and the potential of the first output signal line 612 (signal 703) is changed. Hereinafter, the second edge sensitive latch 602 to the ninth edge sensitive latch 609 respectively change the potentials of the second output signal line 613 (signal 704) to the ninth output signal line 620 (signal 711), while delaying by one clock. Here, when the first output signal line 612, the fifth output signal line 616, and the ninth output signal line 620 are respectively set as the first ADC enable signal line 212, the second ADC enable signal line 213, the third ADC enable signal line 214, so that a timing chart shown in FIG. 5 can be realized.

Here, although the number of ADCs is increased in the column direction in the case where spatial resolution of a touch panel is improved, the number of stages of a shift register may be similarly increased. Accordingly, the number of signal lines for signal input from the external. Further, since the number of bits of the ADC is increased in order to increase the number of gray scales, the number of signal lines is accordingly increased. Accordingly, a circuit scale is increased because each signal line is controlled. However, by using a shift register mode, only an increase of the number of kinds of shift registers with an increase by one bit is needed regardless of the number of ADCs. For example, in the case of the abovementioned structure, two kinds of shift registers, a shift register for generating a set signal and a shift register for generating a reset signal, may be increased with an increase by one bit. Regarding the number of signal lines, if the number of ADCs increases, the number of set signal lines, reset signal lines, and the like are increased. That is, the number of ADCs is double in accordance with an increase by one bit. However, since wiring can be provided on a touch panel as for set signals and reset signals, providing is easier than the case of supplying signals from an external circuit. Accordingly, the number of bits can be easily increased. That is, reading image with high spatial resolution and high gray scale can be easily realized. Further, the shift registers can be included in the ADC control circuit 204 shown in FIG. 2.

In this manner, the A/D converter circuits sequentially operates in time series not at the same time, so that instantaneous increase of power consumption can be prevented because not all of the A/D converter circuits operate at the same time. During a period of operating one of a plurality of A/D converter circuits, at least one of the other a plurality of A/D converter circuits can be set not to operate. Accordingly, instantaneous increase of power consumption can be prevented. Periods when the plurality of A/D converter circuits operates can be set not to overlap each other. Accordingly, instantaneous increase of power consumption can be prevented.

In this manner, a touch panel which enables reading image to perform with high spatial resolution and high gray scale level at high-speed and low power consumption can be provided.

Embodiment Mode 4

In this embodiment, a display device including the touch panel described in Embodiments 1 to 3 is described with reference to FIG. 8 and FIG. 9. In this embodiment, a touch panel includes a photo sensor and a display element. As the display element, a liquid crystal display element or a light-emitting element can be used.

Figure 8:
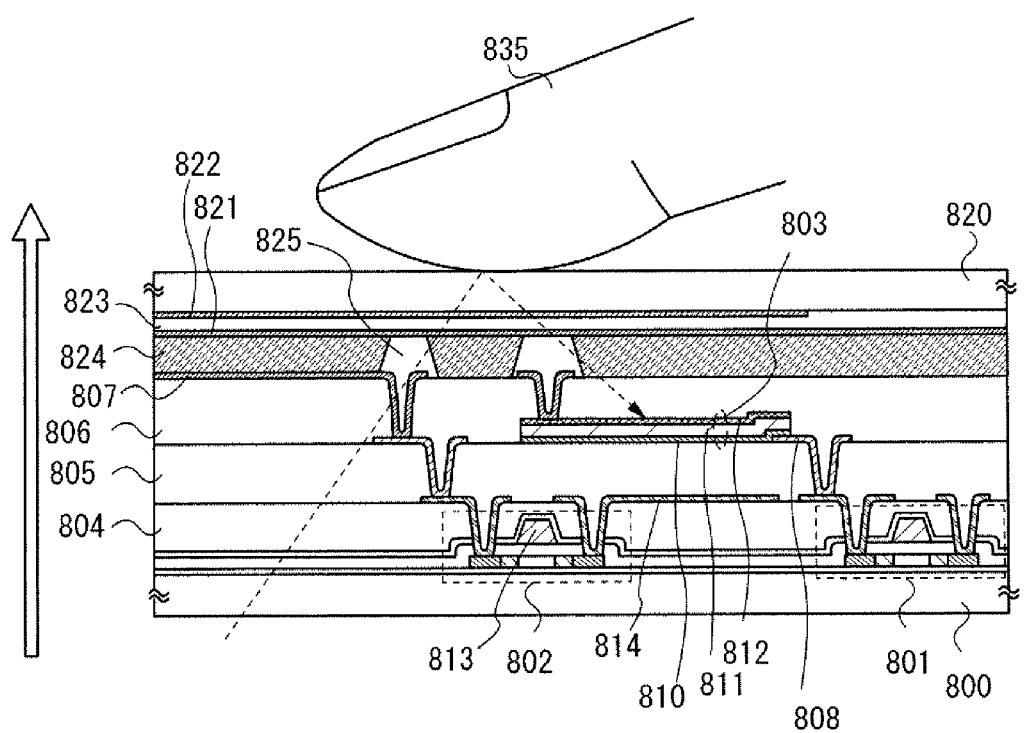
FIG. 8 is an example of a cross-sectional view of a liquid crystal display device including a touch panel.

FIG. 8 shows a diagram illustrating a cross-sectional view of a liquid crystal display device using a liquid crystal element as a display element in a display device including the touch panel which is illustrated in Embodiments 1 to 3. A state that light from a backlight is reflected by a finger 835 which an object to be detected and a photo sensor 803 is irradiated with the light is shown.

As a substrate 800, a light-transmitting substrate such as a glass substrate or a quartz substrate is used. Over the substrate 800, a thin film transistor 801, a thin film transistor 802, and the photo sensor 803 are provided. In the photo sensor 803, an n-type semiconductor layer 810, an i-type semiconductor layer 811, and a p-type semiconductor layer 812 are stacked in this order. The n-type semiconductor layer 810 contains an impurity element imparting one conductivity type (e.g., phosphorus). The i-type semiconductor layer 811 is an intrinsic semiconductor. The p-type semiconductor layer 812 contains an impurity element imparting another one conductivity type (e.g., boron).

In FIG. 8, top gate thin film transistors are used as the thin film transistors 801 and 802, but the present invention is not limited to top gate thin film transistors: bottom gate thin film transistors may also be used. Further, although the photo sensor 803 includes the n-type semiconductor layer 810, the i-type semiconductor layer 811, and the p-type semiconductor layer 812 in this embodiment, but the present invention is not limited to this structure.

In this embodiment, a crystalline semiconductor layer can be used as a semiconductor layer included in the thin film transistor 801 and the thin film transistor 802. For example, polycrystalline silicon can be used but the present invention is not limited to this. An amorphous silicon, single crystal silicon, an organic semiconductor such as pentacene, an oxide semiconductor, or the like may be used as a semiconductor layer included in the thin film transistor 801 and the thin film transistor 802. Note that in the case where a semiconductor layer using single crystal silicon is formed over the substrate 800, the substrate 800 is bonded to a single crystal silicon substrate in which a damaged region is provided at a predetermined depth from a surface, and the single crystal silicon substrate is separated at the damaged region. As the oxide semiconductor, a composite oxide of an element selected from indium, gallium, aluminum, zinc, tin, or the like can be used.

An insulating layer 804 is provided over and to cover the thin film transistors 801 and 802. An insulating layer 805 is provided over the insulating layer 804, and an insulating layer 806 is provided over the insulating layer 805. A pixel electrode 807 is provided over the insulating layer 806, and the photo sensor 803 and a lower electrode 808 are provided over the insulating layer 805. By the lower electrode 808, the photo sensor 803 and the thin film transistor 801 are electrically connected to each other through an opening portion provided in the insulating layer 805.

In addition, a counter substrate 820 is provided with a counter electrode 821, a color filter layer 822, and an overcoat layer 823. The counter substrate 820 and the substrate 800 are attached to each other with a sealant, and a substantially even distance between the substrates is kept by a spacer 825. A liquid crystal layer 824 is sandwiched between the pixel electrode 807 and the counter electrode 821, whereby a liquid crystal element is formed.

The color filter layer 822 is preferably provided so as to overlap with both the photo sensor 803 and the pixel electrode 807 as shown in FIG. 8.

In addition, the photo sensor 803 overlaps with a gate electrode 813 of the thin film transistor 802 as shown in FIG. 8 and may be preferably provided so as to overlap with also a signal line 814 of the thin film transistor 802.

A backlight is provided for the liquid crystal display device in this embodiment. In FIG. 8, the backlight is provided on the substrate 800 side, and light is emitted in a direction indicated by a dashed-line arrow. As the backlight, a cold cathode fluorescent lamp (CCFL) or a white light-emitting diode can be used. A white light-emitting diode is preferable because the adjustable range of brightness is wider than that of a cold cathode fluorescent lamp.

Further, for example, the photo sensor 803 can also be provided for a driver circuit portion to detect outside light, whereby the brightness (luminance) of the backlight can be adjusted so as to enable display to be appropriate for the usage environment of the touch panel.

In addition, a backlight is not limited to the above structure. For example, a light-emitting diode (LED) of RGB may be used to form a backlight, or color display can be performed in a field sequential mode with sequentially lighting of an LED backlight of RGB. A color filter layer is not necessary in this case.

Here, an example of a manufacturing method of a liquid crystal display device shown in FIG. 8 is briefly described.

First, top gate thin film transistors each including a crystalline semiconductor layer as an active layer are formed. Here, the thin film transistor 802 including the gate electrode 813 and the thin film transistor 801 which is electrically connected to the photo sensor 803 are formed over the same substrate. An n-type thin film transistor or a p-type thin film transistor can be used as each transistor. Further, a storage capacitor can be formed through the same process as these transistors. Note that, in the storage capacitor, a semiconductor layer may be used as a lower electrode, a capacitor wiring may be used as an upper electrode, and an insulating film which is formed in the same process as a gate insulating layer of the thin film transistor 801 and the thin film transistor 802 may be used as a dielectric.

In addition, contact holes are formed in the insulating layer 804 which is one of interlayer insulating layers, and a source electrode or a drain electrode which is electrically connected to the semiconductor layer of each of the thin film transistors, or a connection electrode which is connected to an upper wiring is formed. Moreover, a signal line of the thin film transistor 801 which is electrically connected to the photo sensor 803 is formed through the same process. Further, the signal line 814 of the thin film transistor 802 is also formed through the same process.

Next, the insulating layer 805 which covers the signal line 814 is formed. Note that in this embodiment, since a transparent-type liquid crystal display device is shown as an example, the insulating layer 805 is formed of an insulating material through which visible light can pass. Then, a contact hole is formed in the insulating layer 805, and the lower electrode 808 is formed over the insulating layer 805.

Then, the photo sensor 803 is formed so as to overlap with at least part of the lower electrode 808. The lower electrode 808 is electrically connecting the photo sensor 803 and the thin film transistor 801. In the photo sensor 803, the n-type semiconductor layer 810, the i-type semiconductor layer 811, and the p-type semiconductor layer 812 are stacked in this order. In this embodiment, microcrystalline silicon containing phosphorus, amorphous silicon, and microcrystalline silicon containing boron are stacked as the n-type semiconductor layer 810, the i-type semiconductor layer 811, and the p-type semiconductor layer 812, respectively, by using a plasma CVD method.

Next, the insulating layer 806 which covers the photo sensor 803 is formed. In the case of a transparent-type liquid crystal display device, the insulating layer 806 is formed of an insulating material through which visible light can pass. Then, a contact hole is formed in the insulating layer 806, and the pixel electrode 807 is formed over the insulating layer 806. A wiring which is electrically connected to the p-type semiconductor layer 812 which is an upper electrode of the photo sensor 803 is formed in the same layer as the layer of the pixel electrode 807.

Next, the spacer 825 is formed over the insulating layer 806. Although a columnar spacer (a post spacer) is provided as the spacer 825 in FIG. 8, a spherical spacer (a bead spacer) may be alternatively used.

Then, when a TN liquid crystal or the like is used as the liquid crystal layer 824, an alignment film is formed over the pixel electrode 807 by coating, and rubbing treatment is performed thereon.

Meanwhile, the color filter layer 822, the overcoat layer 823, and the counter electrode 821 are formed over the counter substrate 820. An alignment film is formed over the counter electrode 821 by coating, and rubbing treatment is performed thereon.

After that, a surface of the substrate 800 over which the alignment film is formed by coating, and a surface of the counter substrate 820 over which the alignment film is formed by coating, are attached to each other with a sealant. A liquid crystal is placed between these substrates by a liquid crystal dropping method or a liquid crystal injection method, whereby the liquid crystal layer 824 is formed.

Note that a blue-phase liquid crystal for which an alignment film is not necessary may be used as the liquid crystal layer 824. A blue phase is one of the liquid crystal phases, which is generated just before a cholesteric phase changes into an isotropic phase while temperature of cholesteric liquid crystal is increased. Since the blue phase appears only in a narrow temperature range, in order to use in the liquid crystal layer 824, a liquid crystal composition in which 5 wt. % or more of a chiral material is mixed is used in order to broaden the temperature range. As for the liquid crystal composition which contains a blue-phase liquid crystal and a chiral material, the response speed is as high as 10 μs to 100 μs, alignment treatment is not necessary due to optical isotropy, and viewing angle dependence is low.

Next, in the display device having the touch panel described in Embodiments 1 to 3, an electroluminescent display device (hereinafter, referred to as an EL display device) in which a light-emitting element is used as a display element is described.

Figure 9:
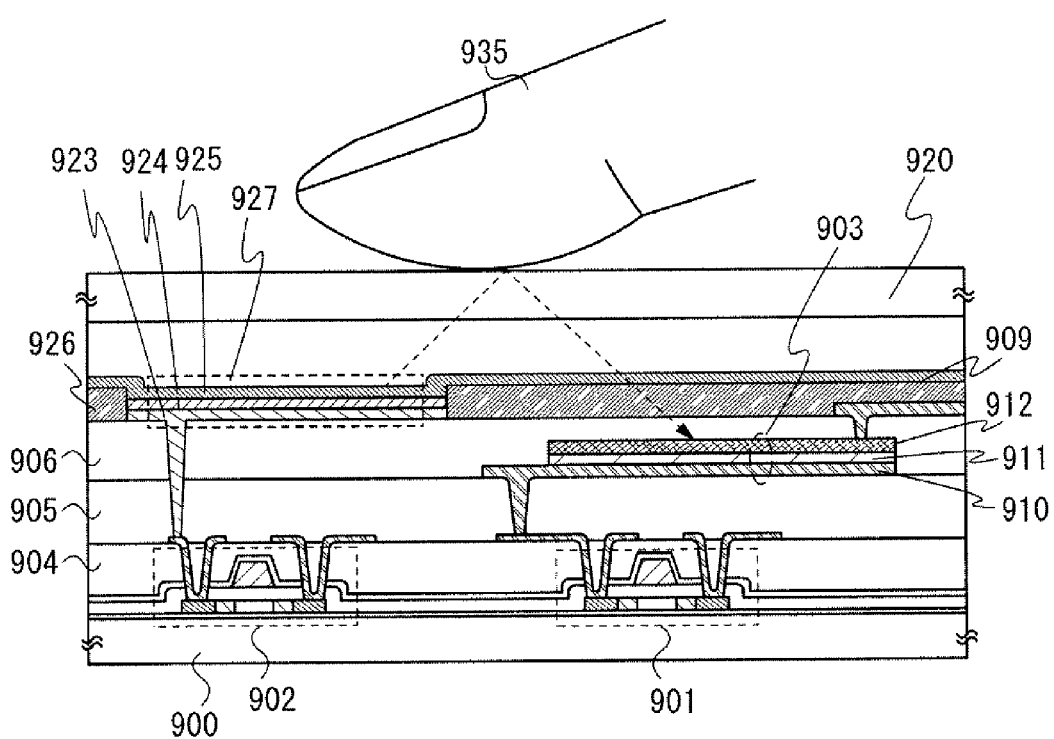
FIG. 9 is an example of a cross-sectional view of an EL display device including a touch panel.

FIG. 9 is a cross-sectional view of an EL display device using an EL element (e.g. an organic EL element, an inorganic EL element, or an EL element including an organic substance and an inorganic substance) as a light-emitting element in the abovementioned display device having the touch panel. A state that light emitted from an EL element 927 is reflected by a finger 935 which is an object to be detected, and a photo sensor 903 is irradiated with the light is shown.

In FIG. 9, a thin film transistor 901, a thin film transistor 902, and the photo sensor 903 are provided on a substrate 900. In the photo sensor 903, an n-type semiconductor layer 910, an i-type semiconductor layer 911, and a p-type semiconductor layer 912 are stacked in this order. The substrate 900 is bonded to a counter substrate 920 by a sealant.

An insulating layer 904 is provided over and to cover the thin film transistors 901 and 902. An insulating layer 905 is provided over the insulating layer 904, and an insulating layer 906 is provided over the insulating layer 905. The EL element 927 is provided over the insulating layer 906, and the photo sensor 903 is provided over the insulating layer 905. The n-type semiconductor layer 910 in the photo sensor 903 electrically connects between the photo sensor 903 and the thin film transistor 901 through an opening portion provided in the insulating layer 905.

Further, a sensor wiring 909 electrically connects between the p-type semiconductor layer 912 and another wiring.

In the EL element 927, a stack of a pixel electrode 923, a light-emitting layer 924, and a counter electrode 925 are provided. Note that a bank 926 divides between light-emitting layers of adjacent pixels.

Either an n-type thin film transistor or a p-type thin film transistor can be used as each of the thin film transistor 901 and the thin film transistor 902. In the ease where the pixel electrode 923 functions as a cathode, the thin film transistor 902 which is electrically connected to the pixel electrode 923 is preferably an n-type thin film transistor, considering the direction of current. In addition, in the case where the pixel electrode 923 functions as an anode, the thin film transistor 902 is preferably a p-type thin film transistor.

Note that this embodiment can be freely combined with Embodiments 1 to 3.

Embodiment 5

In this embodiment, an example of an electronic device where the touch panel described in Embodiments 1 to 4 or a display device having the touch panel is applied to a display portion is described with reference to FIGS. 10A and 10B and FIGS. 11A and 11B.

Figure 10A:
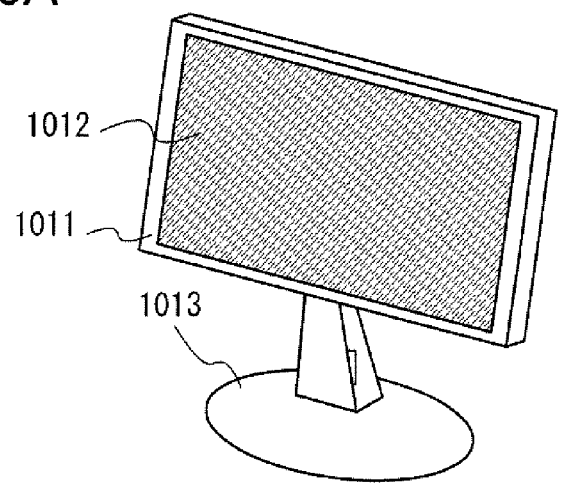
FIGS. 10A and 10B each illustrate an example of an electronic device to which a touch panel is applied.

A monitor type touch panel to which the touch panel described in the above embodiment is applied is shown in FIG. 10A. The monitor type touch panel shown in FIG. 10A includes a housing 1011, a display portion 1012, and a support 1013. The touch panel which is described in the above embodiment is incorporated in the housing 1011, and a photo sensor is provided in each pixel of the display portion 1012. The display portion 1012 has a display function and an information input function. With the use of the touch panel which is described in the above embodiment, high-sensitivity detection can be performed, whereby a monitor type touch panel with high precision in reading data can be obtained.

Figure 10B:
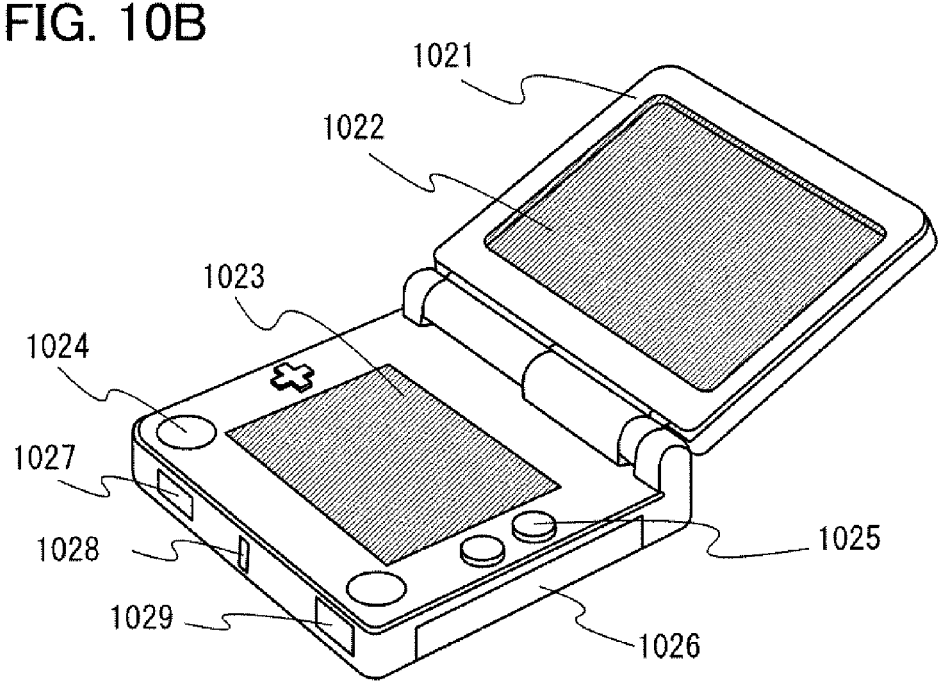

A portable game machine to which the touch panel described in the above embodiment is applied is shown in FIG. 10B. The portable game machine illustrated in FIG. 10B includes a housing 1021, a first display portion 1022, a second display portion 1023, speaker portions 1024, operation keys 1025, a storage medium insertion portion 1026, an external connection port 1027, an LED lamp 1028, and a microphone 1029. The portable game machine illustrated in FIG. 10B has a function of reading out a program or data stored in a storage medium and displaying an image on the first and second display portions 1022 and 1023, and can also share information with another portable game machine by wireless communication. The touch panel described in the above embodiment is applied for one or both of the first display portion 1022 and the second display portions 1023, whereby high-sensitivity detection is possible. Accordingly, a game machine whose reading accuracy is high and security can be improved and which can provide a game which is more complicated and sophisticated than the conventional one can be obtained.

Figure 11A:
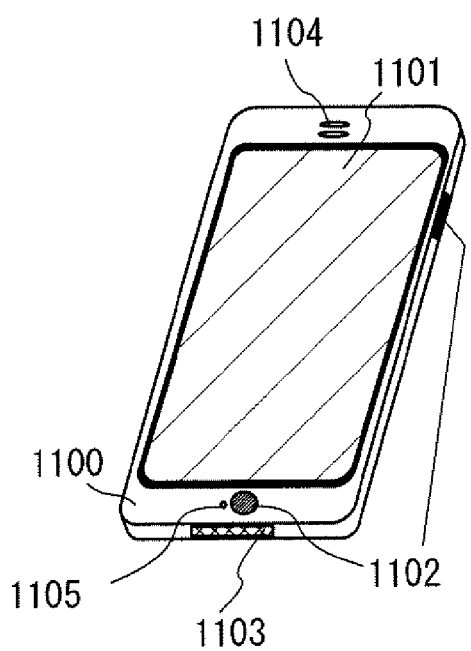
FIGS. 11A and 11B illustrate an example of a mobile phone to which a touch panel is applied.
Figure 11B:
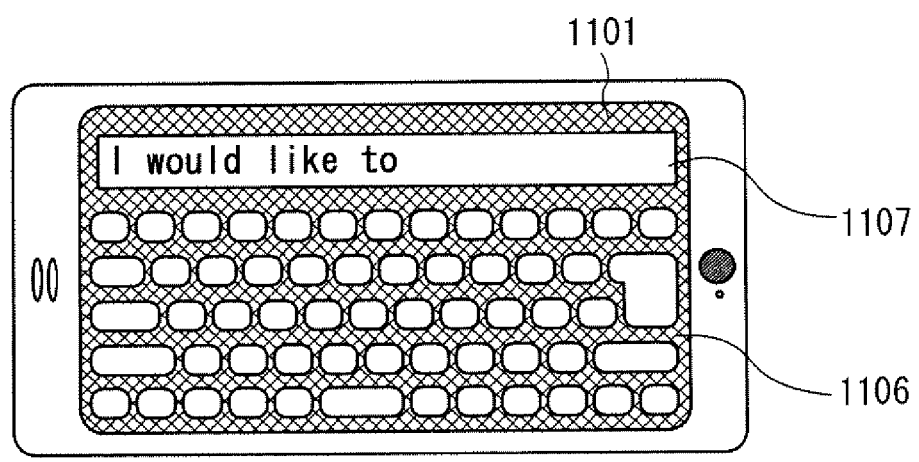

An example of a mobile phone (a so-called smartphone) to which the touch panel described in the above embodiment is applied is shown in FIGS. 11A and 11B. The mobile phone shown in FIG. 11A includes a housing 1100, a display portion 1101, operation buttons 1102, an external connection port 1103, a speaker 1104, and a microphone 1105. By touching the display portion 1101 with a finger or the like, information can be input to the mobile phone.

There are mainly three screen modes of the display portion 1101. The first mode is a display mode mainly for displaying an image. The second mode is an input mode mainly for inputting information such as characters, letters, or the like. The third mode is a display-and-input mode in which two modes of the display mode and the input mode are combined.

FIG. 11B is a front view of the mobile phone in the input mode. As shown in FIG. 11B, a keyboard 1106 is displayed in the display portion 1101. Letters or characters input from the keyboard 1106 are displayed on a screen 1107. Since an input operation of letters or characters precedes in the input mode, the keyboard 1106 is displayed on most part of the screen in the display portion 1101. Key arrangement of the keyboard 1106 is changed depending on a language to be used.

Note that, when a sensor for detecting inclination, such as an acceleration sensor, is provided inside the mobile phone shown in FIGS. 11A and 11B, display on the screen in the display portion 1101 can be automatically switched by determining the orientation of the mobile phone (whether the mobile phone is placed horizontally or vertically for a landscape mode or a portrait mode).

Further, the screen modes are switched by contact with the display portion 1101 (touch operation) or operation of the operation buttons 1102. Alternatively, the screen modes can be switched depending on the kind of the image displayed on the display portion 1101. For example, when a signal for an image displayed on the display portion 1101 is data of moving images, the screen mode can be switched to the display mode, and when the signal is text data, the screen mode can be switched to the input mode.

Moreover, in the input mode, when a signal detected by a photo sensor in the display portion 1101 is judged and input by touching the display portion 1101 is not performed for a certain period, the screen mode may be switched from the input mode to the display mode.

The touch panel described in the above embodiment can be applied for the display portion 1101. For example, an image of a palm print, a fingerprint, or the like is taken by touching the display portion 1101 with the palm, the finger, or the like whereby personal authentication can be performed. Moreover, when a backlight which emits near-infrared light or a sensing light source which emits near-infrared light is provided in the display portion 1101, an image of a finger vein, a palm vein, or the like can be taken. Since high-sensitivity detection can be performed by applying the touch panel described in the above embodiment, a mobile phone including a touch panel with high accuracy in reading data can be obtained. Therefore, by registering a fingerprint of a user for example, a mobile phone with high security which can be used only by a user whose fingerprint is registered can be obtained.

In this manner, the touch panel described in the above embodiment is applied, whereby the electronic device including a display portion having the above effect can be obtained.

Note that this embodiment can be freely combined with Embodiments 1 to 4.

This application is based on Japanese Patent Application serial no. 2008-327920 filed with Japanese Patent Office on Dec. 24, 2008, the entire contents of which are hereby incorporated by reference.

What is claimed is:

1. A touch panel comprising:
   a pixel circuit including a plurality of pixels, each pixel including a photo sensor; and
   a photo sensor signal line reading circuit for taking an output signal of the photo sensor, the photo sensor signal line reading circuit including a plurality of A/D converter circuits and an ADC control circuit,
   wherein the plurality of A/D converter circuits are provided at every one column or at every plurality of columns of the plurality of pixels,
   wherein the ADC control circuit includes a shift register configured to sequentially supply ADC enable signals to the plurality of A/D converter circuits, and
   wherein each of the plurality of A/D converter circuits is connected to the ADC control circuit via an ADC enable signal line, a plurality of ADC reset signal lines, a plurality of ADC set signal lines, and an ADC output signal line.

2. A display device comprising the touch panel according to claim 1, wherein each of the plurality of pixels includes a display element.

3. A display device according to claim 2, wherein the display element comprises a thin film transistor.

4. An electronic device wherein the touch panel according to claim 1 is used in a display portion.

5. An electronic device according to claim 4, the electronic device is one of a monitor, a portable game machine, and a mobile phone.

6. A touch panel comprising:
   a pixel circuit including a plurality of pixels, each pixel including a photo sensor; and
   a photo sensor signal line reading circuit for taking an output signal of the photo sensor, the photo sensor signal line reading circuit including a plurality of A/D converter circuits and an ADC control circuit,
   wherein the plurality of A/D converter circuits are provided at every one column or at every plurality of columns of the plurality of pixels,
   wherein each of the plurality of A/D converter circuits is connected to the ADC control circuit via an ADC enable signal line, a plurality of ADC reset signal lines, a plurality of ADC set signal lines, and an ADC output signal line, and
   wherein the plurality of A/D converter circuits are sequentially operated in time series, not at the same time.

7. A display device comprising the touch panel according to claim 6, wherein each of the plurality of pixels includes a display element.

8. A display device according to claim 7, wherein the display element comprises a thin film transistor.

9. An electronic device wherein the touch panel according to claim 6 is used in a display portion.

10. An electronic device according to claim 9, the electronic device is one of a monitor, a portable game machine, and a mobile phone.

11. A touch panel comprising:
    a pixel circuit including a plurality of pixels, each pixel including a photo sensor; and
    a photo sensor signal line reading circuit for taking an output signal of the photo sensor, the photo sensor signal line reading circuit including a plurality of A/D converter circuits and an ADC control circuit,
    wherein each of the plurality of A/D converter circuits is connected to the ADC control circuit via an ADC enable signal line, a plurality of ADC reset signal lines, a plurality of ADC set signal lines, and an ADC output signal line,
    wherein the plurality of A/D converter circuits are provided at every one column or at every plurality of columns of the plurality of pixels,
    wherein each of the plurality of A/D converter circuits has a comparator circuit, and
    wherein the plurality of A/D converter circuits are sequentially operated in time series and periods when the comparator circuits of the plurality of A/D converter circuits are operated do not overlap with each other.

12. A display device comprising the touch panel according to claim 11, wherein each of the plurality of pixels includes a display element.

13. A display device according to claim 12, wherein the display element comprises a thin film transistor.

14. An electronic device wherein the touch panel according to claim 11 is used in a display portion.

15. An electronic device according to claim 14, the electronic device is one of a monitor, a portable game machine, and a mobile phone.

16. A touch panel comprising:
    a pixel circuit including a plurality of pixels over a substrate, each pixel including a photo sensor; and
    a photo sensor signal line reading circuit for taking an output signal of the photo sensor over the substrate, the photo sensor signal line reading circuit including a plurality of A/D converter circuits and an ADC control circuit,
    wherein the plurality of A/D converter circuits are provided at every one column or at every plurality of columns of the plurality of pixels,
    wherein the ADC control circuit includes a shift register configured to sequentially supply ADC enable signals to the plurality of A/D converter circuits,
    wherein each of the plurality of A/D converter circuits has a comparator circuit, and
    wherein periods when the comparator circuits of the plurality of A/D converter circuits are operated do not overlap with each other.

17. A display device comprising the touch panel according to claim 16, wherein each of the plurality of pixels includes a display element.

18. A display device according to claim 17, wherein the display element comprises a thin film transistor.

19. An electronic device wherein the touch panel according to claim 16 is used in a display portion.

20. An electronic device according to claim 19, the electronic device is one of a monitor, a portable game machine, and a mobile phone.

* * * * *